United States Patent
Chen et al.

(10) Patent No.: US 11,062,224 B2
(45) Date of Patent: Jul. 13, 2021

(54) PREDICTION USING FUSION OF HETEROGENEOUS UNSTRUCTURED DATA

(71) Applicant: NIKE, Inc., Beaverton, OR (US)

(72) Inventors: George Chen, Cambridge, MA (US); Vishal Doshi, Somerville, MA (US); Ying-zong Huang, Seattle, WA (US); Vighnesh Sachidananda, Stanford, CA (US); Devavrat Shah, Waban, MA (US); Vasudha Shivamoggi, Boston, MA (US)

(73) Assignee: NIKE, Inc., Beaverton, OR (US)

( * ) Notice: Subject to any disclaimer, the term of this patent is extended or adjusted under 35 U.S.C. 154(b) by 592 days.

(21) Appl. No.: 15/294,659

(22) Filed: Oct. 14, 2016

(65) Prior Publication Data

US 2018/0107763 A1   Apr. 19, 2018

(51) Int. Cl.
  *G06N 7/00* (2006.01)
  *G06F 16/9536* (2019.01)
  *G06N 5/04* (2006.01)
  *G06Q 30/06* (2012.01)
  *G06N 5/02* (2006.01)

(52) U.S. Cl.
  CPC ......... *G06N 7/005* (2013.01); *G06F 16/9536* (2019.01); *G06N 5/04* (2013.01); *G06Q 30/0601* (2013.01); *G06N 5/025* (2013.01)

(58) Field of Classification Search
  CPC .. G06F 16/2237; G06F 16/9536; G06N 7/005
  See application file for complete search history.

(56) References Cited

U.S. PATENT DOCUMENTS

| | | | | |
|---|---|---|---|---|
| 8,868,472 B1* | 10/2014 | Lin | ........................ | G06N 20/00 706/12 |
| 2014/0180760 A1* | 6/2014 | Karatzoglou | ...... | G06Q 30/0269 705/7.29 |
| 2014/0351281 A1* | 11/2014 | Tunstall-Pedoe | ........ | G06N 5/02 707/760 |
| 2016/0100000 A1* | 4/2016 | Dey | .................... | G06Q 10/101 709/205 |

(Continued)

OTHER PUBLICATIONS

Liu, Ting, et al. "An investigation of practical approximate nearest neighbor algorithms", Advances in neural information processing systems, 2005, [retrieved Nov. 20, 2020], [retrieved from URL<https://proceedings.neurips.cc/paper/2004/file/1102a326d5f7c9e04fc3c89d0ede88c9-Paper.pdf>] (Year: 2005).*

*Primary Examiner* — Giuseppi Giuliani
(74) *Attorney, Agent, or Firm* — Schwegman Lundberg & Woessner, P.A.

(57) ABSTRACT

Methods and apparatus for predicting unknown values given a data set of known values. A prediction engine ingests a variety of data sets. Once the dataset has been ingested, requests for predictions may be presented to the prediction engine. The engine responds with a prediction as well as a confidence score based on the ingested information using a variety of techniques. Some of these techniques identify witness values in the ingested data that are similar to the requested prediction, other techniques compute witness values from ingested data, etc. These witness values are aggregated to yield an answer and a confidence level in a way that permits the user to review the underlying witness values.

23 Claims, 7 Drawing Sheets

(56) References Cited

U.S. PATENT DOCUMENTS

2016/0188638 A1\* 6/2016 Tran ................. G06F 16/21
707/803
2017/0278114 A1\* 9/2017 Renders ............. G06Q 30/0282

\* cited by examiner

PREDICTION USING FUSION OF HETEROGENEOUS UNSTRUCTURED DATA

TECHNICAL FIELD

Various embodiments described herein generally relate to methods and systems for making predictions based on known data and, more particularly, but not exclusively, to methods and systems for predicting transactions using a set of known data.

BACKGROUND

"Big data" infrastructure is known to the prior art. Various techniques exist for collecting massive amounts of data, such as web scraping, social media, mobile phones, etc. Various systems exist for storing the collected data efficiently to enable queries at scale, including but not limited to Hadoop File System, Cassandra, etc. Various known systems also exist for performing computation at scale with collected and stored data, such as Hadoop and MapReduce.

However, the prior art is lacking when it comes to making meaningful decisions using large quantities of data. One reason for this deficiency is the inability to accurately account for unknowns. Unfortunately, prediction tasks are relatively commonplace. For example, a retailer would like to know what a customer may be interested in purchasing based on the customer's recent and past history of purchases.

A need exists, therefore, for methods and systems that predict unknowns from existing data sets.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Various embodiments relate to methods and apparatus for predicting unknown values given a data set of known values. A prediction engine ingests a variety of data sets. Each data set may come from an arbitrary source in an arbitrary format, but it can typically be recharacterized as a transaction (i.e., a record of values) taking one or more relevant forms One form of interest is: (actor action object), i.e., wherein the optional "object" field is the recipient of the action, and may or may not be a physical object (or a person, a location, a geographic entity, etc.). Another form of interest is: (entity feature), i.e., which may also be recast as (entity feature null), where there is no "object" or where the "object" field is empty.

As part of the ingestion process, the prediction engine typically recasts the original data set into (actor action object) tuples and may further associate each tuple with one or more data values, including but not limited to text, images, numerical data, location data, etc., and possibly metadata values such as confidence, time, etc.

Once the dataset has been ingested, requests for predictions may be presented to the prediction engine. The engine responds with a prediction as well as a confidence score based on the ingested information using a variety of techniques. Some of these techniques identify witness values in the ingested data that are similar to the requested prediction, other techniques compute witness values from ingested data, etc. These witness values are aggregated to yield an answer and a confidence level in a way that permits the user to review the witness values underlying the answer.

The architecture implementing the prediction engine is organized as a plurality of dynamic worker tasks that can be repurposed depending on the current tasks to be performed by the engine. For example, when the task is data ingestion, one or more workers may be repurposed to, e.g., transform various values associated with data tuples. When the task is prediction, worker tasks may be repurposed to, e.g., identify relevant witness values that are similar to the requested prediction or compute a prediction using regression-like algorithms.

In one aspect, embodiments of the present invention relate to a method for transaction prediction using a computer comprising a processor and a memory containing non-transitory instructions configured to be executed by the processor. The method includes receiving a query; searching a data store for witness values to the query; aggregating the witness values into an answer and a confidence level; and transmitting the answer and the confidence level.

In one embodiment, the query is a plurality of attributes.

In one embodiment, the method further includes answering the query by computing witness values using at least one regression-like algorithm.

In one embodiment, aggregating the witness values gives higher weights to witness values having higher confidence.

In one embodiment, aggregating the witness values gives higher weights to witness values similar to the query.

In one embodiment, searching the data store uses at least one of matrix completion, tensor completion, feature inference and action feature inference on entries in the data store to generate witness values for the query.

In one embodiment, the method further includes receiving at least one transaction, each transaction comprising a tuple and an associated value; converting the associated value into a vector; and storing the tuple and vector in the data store. In one embodiment, the answer and the confidence level are computed using a regression on stored vectors. In one embodiment, the answer and the confidence level are computed by computing similarity measures between at least two stored vectors. In one embodiment, the associated value is selected from the group consisting of text, an image, numeric data, and location data. In one embodiment, the method further includes receiving a request for support concerning the answer; and providing at least one of the witness values and the received value associated with the at least one witness value in response to the request for support.

In one embodiment, the query takes the form: (actor, action, object). In one embodiment, the query is selected from the group consisting of: (country interaction country), (source IP address, communicate, destination IP address), (customer browse article), and (customer buy article).

In one aspect, embodiments of the present invention relate to a system for transaction prediction. The system includes at least one data store, the data store comprising a computer-readable memory storing a plurality of vectors and tuples of attributes; a computing pool in communication with the at least one data store and comprising a plurality of worker tasks; and an interface in communication with the computing pool and configured to receive a query and communicate the query to the computing pool for execution.

In one embodiment, each worker task can be dynamically configured to perform a different operation.

In one embodiment, the query is a tuple of attributes.

In one embodiment, the computing pool executes the query by assigning it to a worker task that searches the at least one data store for witness values to the query, aggregates the witness values into an answer and a confidence level, and returns the answer and the confidence level. In one embodiment, the worker task gives higher aggregation weights to witness values having higher confidence. In one embodiment, the worker task gives higher aggregation weights to witness values similar to the query.

In one aspect, embodiments of the present invention relate to a computer-readable method containing computer-executable instructions for performing a method for transaction prediction. The medium includes computer-executable instructions for receiving a query; computer-executable instructions for searching a data store for witness values to the query; computer-executable instructions for aggregating the witness values into an answer and a confidence level; and computer-executable instructions for transmitting the answer and the confidence level.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. Various embodiments will now be described, by way of example, with reference to the accompanying drawings, in which.

DETAILED DESCRIPTION

Figure 1:
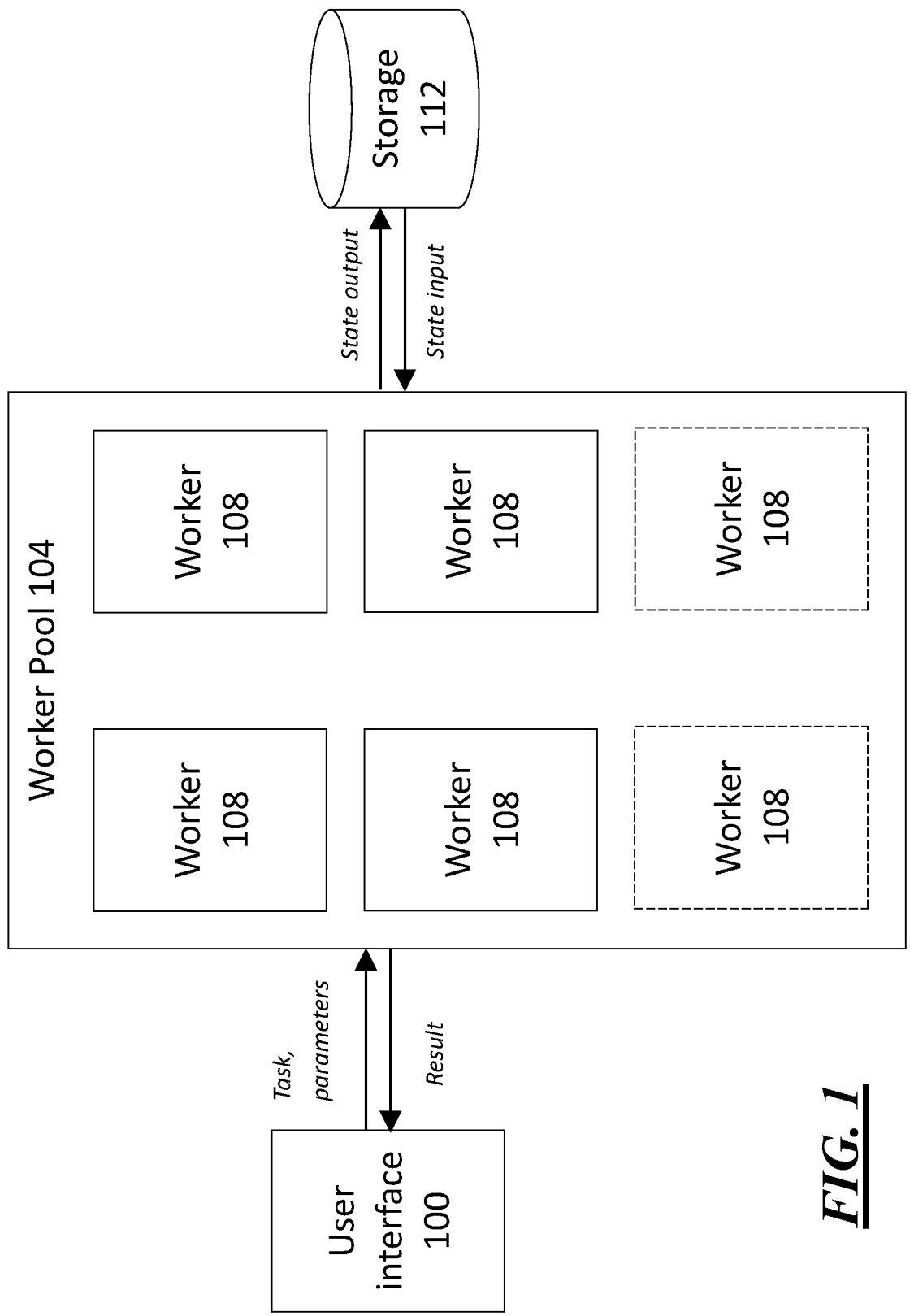
FIG. 1 depicts one example of a computing architecture for implementing a prediction engine.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of the present invention provide a prediction engine to predict unknown transactions from known transaction data. Embodiments of the present invention are capable of ingesting relevant data from a variety of sources (e.g., purchase histories, Internet browsing history, search histories, item catalog data, customer demographics, etc.) and using the resulting aggregation of data to make predictions.

For example, given a collection of data concerning the sale of certain products in certain stores, an embodiment of the present invention may be called upon to predict sales for a certain product in a store for which no sales data is available, or when, where and how much a particular user may spend buying a particular item of clothing. In another example, given a set of news articles, an embodiment of the present invention may be called upon to predict the probability of certain future events.

Embodiments of the present invention may also provide a confidence level in connection with such predictions, and may also provide one or more transactions and or analysis (i.e., "witnesses") supporting the prediction.

FIG. 1 presents an exemplary computing architecture for providing the features of the invention. A user interface 100 accepts input from an operator for configuring, operating, and interacting with the system, while providing the operator with output concerning, e.g., predicted transactions and other results computed by the system. The user interface 100 provides the operator's input to the worker pool 104, which performs the computing related tasks associated with transaction prediction (e.g., ingestion, computation, etc.) using one or more dynamic worker tasks 108. The worker pool 104 interacts with storage 112 to store results from the workers 108 and provide information to workers 108.

The user interface 100 can take a variety of forms in various embodiments. Some user interfaces 100, like a web browser or a dedicated software client, permit direct input and commands to be entered by an operator. Other user interfaces 100, like an API server, permit programmatic interactions with the system by appropriately configured software. An operator can utilize the user interface 100 to, e.g., identify data sets for ingestion, specify desired predictions, enter individual transactions, etc.

The worker pool 104 receives tasks and parameters from the operator. In some embodiments, these tasks and parameters are received as they are entered and then processed by the pool 104. In other embodiments, the interface 100 performs pre-processing on the operator's input (e.g., syntax checking, error checking, formatting, etc.) before passing it to the pool 104.

The pool 104 may be implemented as a physical computer (like a networked server computer) or a virtual computer (such as a hosted computing service like, e.g., Amazon Web Services). The latter class of implementations permits the arbitrary addition of computing resources like processors and memory that may prove useful when ingesting or performing computing operations on sizeable collections of data.

The pool 104 receives tasks and parameters from the interface 100 and services these requests using one or more worker processes 108. These worker processes 108 can be instantiated from a variety of process templates that each offer different functionalities suited to performing the various tasks and sub-tasks necessary to accomplish transaction prediction. These workers 108 can be added, discontinued, or reconfigured as necessary to satisfy an operator specified task or to meet other computing requirements of the system.

As workers 108 perform their computing tasks, they will access large data sets, possibly exceeding the memory allocated to the individual worker 108 or the memory allocated to the pool 104 as a whole (or, in some embodiments, the memory present in the computer(s) implementing the pool 104). Thus, various embodiments of the invention will offer data storage 112 designed and configured to receive, store, and provide access to large data sets, worker process states, etc. In one embodiment, the storage 112 may be implemented using, e.g., Apache Cassandra on one or more physical or virtual server computers.

Figure 2:
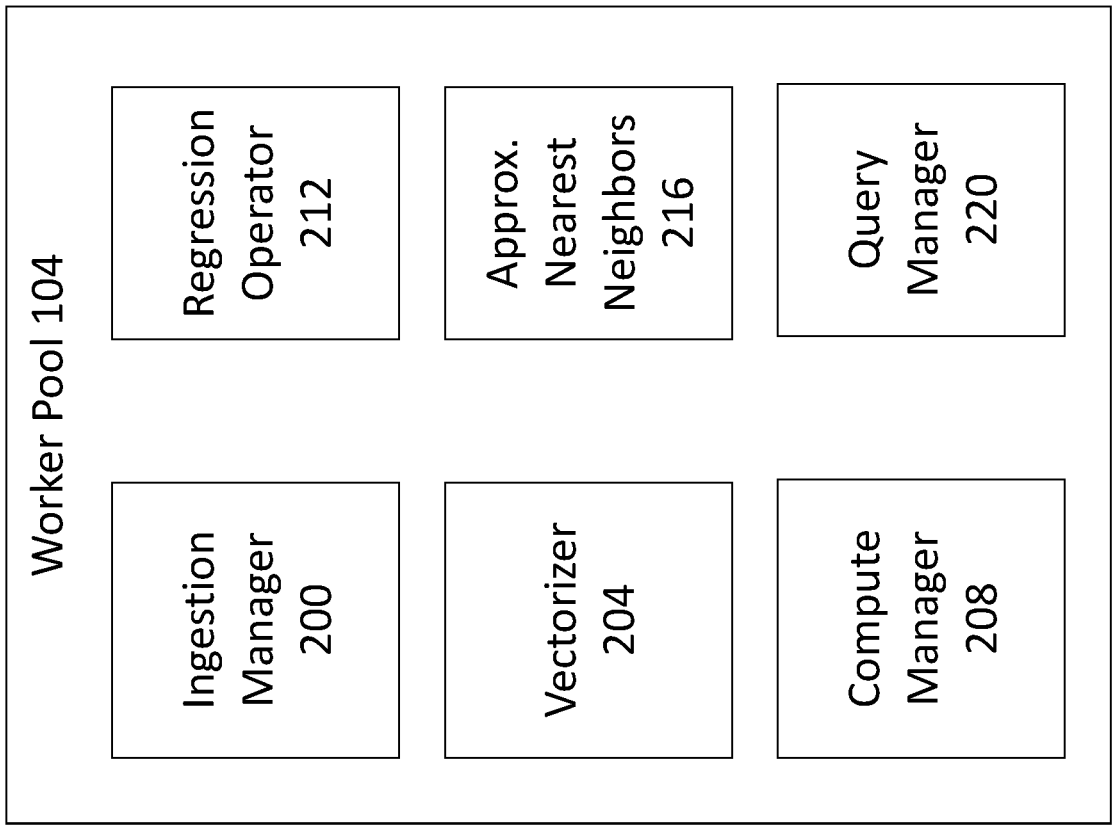
FIG. 2 depicts the worker pool 104 of FIG. 1, with various worker tasks 108 configured to perform computing tasks for the prediction engine.

FIG. 2 presents an example of a worker pool 104 hosting various worker processes 108 configured to perform various tasks in connection with transaction prediction. As mentioned above, workers 108 can be created, destroyed, or arbitrarily reconfigured by the pool 104 as necessary. The illustration in FIG. 2 is, like the other examples discussed herein, merely exemplary of the principles and features of the present invention. Various embodiments may have some or all of the workers 108 in FIG. 2 at various times, and may utilize other workers 108 not illustrated in FIG. 2.

Ingestion manager 200 handles the import of data sets external to the system. The manager 200 receives various parameters specified using, e.g., the user interface 100. The parameters typically include a location for one or more data sets (e.g., a filepath, uniform resource locator, IP address and port number, etc.) and some indication of the contents of the data set. For example, one of the parameters may specify an "action" associated with the data set. A browsing history may be associated with the action "views"; a history of online purchases may be associated with the action "bought," etc.

Each data set may take the form of, e.g., a database, a spreadsheet, a plaintext file, etc., having one or more transactions, each transaction having one or more fields. A typical transaction would be a collection of cells in a spreadsheet in a Excel file, and may include one or more fields such as actor, business, action, timestamp, confidence, value, etc., and various metadata items such as value type, MIME type, time, identifiers, etc. Each transaction describes one or more items of interest, such as interactions between entities, attributes of various entities, attributes of the interactions, etc.

The ingestion manager 200 accesses the data sets using the received parameters and stores the contents of the data sets in the storage 112. In some embodiments the manager 200 processes the data prior to storage; in other embodiments this processing is performed by another worker process 108

The data processing performed by ingestion manager 200 will vary among embodiments. In some embodiments, the processing includes pre-processing, syntax checking, and other steps necessary prior to successful ingestion. In some embodiments, the processing involves recasting the data into tuples, as described above, or other data formats to facilitate transaction prediction.

In some embodiments, the ingestion manager 200 may also receive individual transactions entered by an operator at the input 100, process them, and store them in storage 112.

As part of the ingestion process, the data values in the imported data sets may be converted into tuples and further associated with one or more additional values. These additional values may take arbitrary and different forms: video, images, sound, time, geographical coordinates, time values, etc. While some of these data types are suited to automated processing, others require additional processing before they are suitable for computerized analysis. In these situations, the worker poll 104 can repurpose one or more worker processes 108 as vectorizers 204. Vectorizers 204 take various types of data values (e.g., text, images, geospatial coordinates) and convert them into a new type of value suited for storage and processing.

In some circumstances, the worker pool 104 needs to perform a variety of coordinated and sophisticated tasks in connection with, e.g., model building, transaction prediction, etc. In these circumstances, processes 108 functioning as a compute manager 208 can coordinate the activity of other worker processes 108 to perform a variety of computing tasks.

For example, once one or more data sets have been ingested by the ingestion manager 200, the compute manager 208 can create and/or command existing processes to form models useful for transaction prediction. The compute manager 208 may also create and/or command existing processes to fill gaps in ingested data with predicted transactions. The compute manager 208 or another subordinate worker process 108 may also perform various computations on the ingested data sets, including but not limited to normalization, filtering, and statistical analysis.

In some embodiments, these models, computations, and gap-filling exercises are anticipatory, seeking to perform likely computations in advance of a request for a predicted transaction to reduce the computational burden at the time of the request and otherwise expedite the prediction. In some embodiments, the compute manager 208 will also perform one or more computing tasks in furtherance of these goals.

For example, a compute manager 208 may command a worker process 108 configured to operate as a regression operator 212 to apply a variety of regression-like operations to ingested data. In various embodiments, these operations include but are not limited to matrix completion (MC), tensor completion (TC), feature inference (FI), and action feature inference (AFI). Applying the operations, the regression operator 212 can prospectively fill gaps in the ingested data, precompute various items anticipated to be required in connection with transaction prediction, and otherwise service requests for transaction prediction. The regression operator may also operate independently of the compute manager 208, subject to the oversight of the mechanisms of the worker pool 104.

Similarly, a compute manager 208 may command a worker process 108 configured to operate as an approximate nearest neighbor (ANN) operator 216 to apply a variety of operations to ingested data to identify similar transactions. In various embodiments, these operations include but are not limited to matrix completion (MC), tensor completion (TC), feature inference (FI), and action feature inference (FI). Applying these operations, the ANN operator 216 can prospectively fill gaps in the ingested data, precompute various items anticipated to be required in connection with transaction prediction, and otherwise service requests for transaction prediction. The ANN operator 216 may also operate independently of the compute manager 208, subject to the oversight of the mechanisms of the worker pool 104.

A worker process 108 configured to operate as a query manager 220 may operate like the compute manager 208, instantiating and controlling other worker processes as needed to satisfy a request for a predicted transaction. For example, upon receiving a tuple not present in the data store 112, the query manager 220 may spawn or configure one or more worker processes 108 to operate as regression operators 212 and/or ANN operators 216 that perform various operations on ingested data (including, but not limited to, MC, TC, FI, AFI, etc.).

The results of these operations (model predictions, witness values, signal-to-noise ratios, etc.) may be returned to the query manager 220 or to another worker process 108 (not shown) which combines all of these results into a single prediction and/or confidence level which may be provided to the operator. The query manager 220 may be further configured to receive from an operator a request for support for the answer, and it or another worker process 108 may respond with a list of individual witness values generated by the individual worker processes 108 and considered when generating the answer.

One form of query may involve finding a tuple having an exact match to a specified value. Another form of query may request records with values similar to that specified, e.g., values that intersect with the specified values, values contained within the specified values, etc.

One particular form of query involves predicting one or more values based on the data sets that have been ingested and processed. This form of query may include an optional confidence value that prevents the return of answers whose confidence value does not equal or exceed the specified confidence value.

Figure 3:
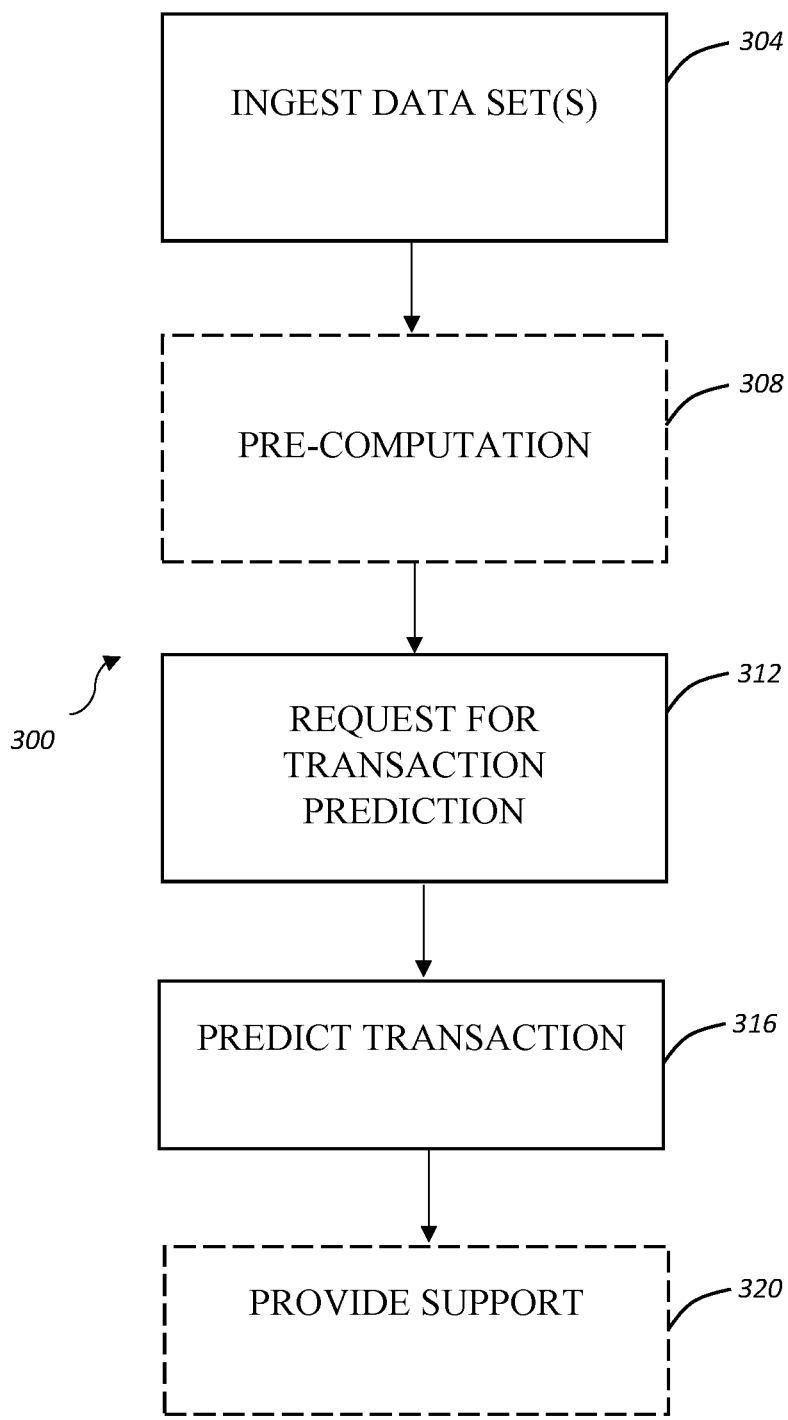
FIG. 3 is a flowchart of an exemplary method for transaction prediction.

FIG. 3 is a flowchart depicting a method 300 for transaction prediction in accord with the present invention. The process begins with the ingestion of one or more data sets and the storage of the ingested results in a suitable data store (Step 304). When one or more data sets are ingested, the system may optionally perform various computations on the ingested data (Step 308). For example, the system may identify gaps in the ingested data, compute various predicted transactions to fil those gaps, create models, create searchable indices, etc. The system may also perform various computations on individual ingested data entries, including but not limited to normalization, filtering, and the computation of various statistics. These optional computations may expedite the servicing of transaction predictions by performing anticipated computations when the system is idle or otherwise available.

When the system receives a request for a predicted transaction from an operator or programmatically through user interface 100, it is assigned to a worker process for servicing (Step 312). The servicing process may in turn instantiate or reconfigure other worker processes to perform various computing operations in connection with the prediction. These operations may include, but are not limited to, index searching, model application, etc. The results of these operations (model predictions, witness values, etc.) are in turn supplied to a worker process that takes these various disparate results and combines them into a single answer that typically takes the form of a prediction and a confidence value in the prediction (Step 316). If the operator wants to scrutinize the underlying analysis supporting the prediction, then he can submit a request for support through the user interface 100 and the system will supply the raw witness values, model predictions, signal-to-noise ratios, etc. used in generating the answer (Step 320).

By way of example, in one embodiment the system is loaded with news articles describing various actions between countries. These news articles are digested and converted into various tuples and values: e.g., (United States; Iraq; Invades)=2003 (Step 304). In an optional step, the system reviews the ingested data and develops a model to determine the probability that the United States may invade other countries (Step 308). Either way, at one point the system receives a request to predict a transaction, namely (Ireland; Russia; Embargo) (Step 312). The system scrutinizes the ingested data to identify similar tuples (e.g., (Ireland; Iraq; Embargo)) and construct models predicting the likelihood of Ireland imposing an embargo on Russia. The system aggregates all of these data points and provides a prediction as well as a confidence level (Step 316). The user may request the underlying details supporting the prediction (Step 320).

Figure 4:
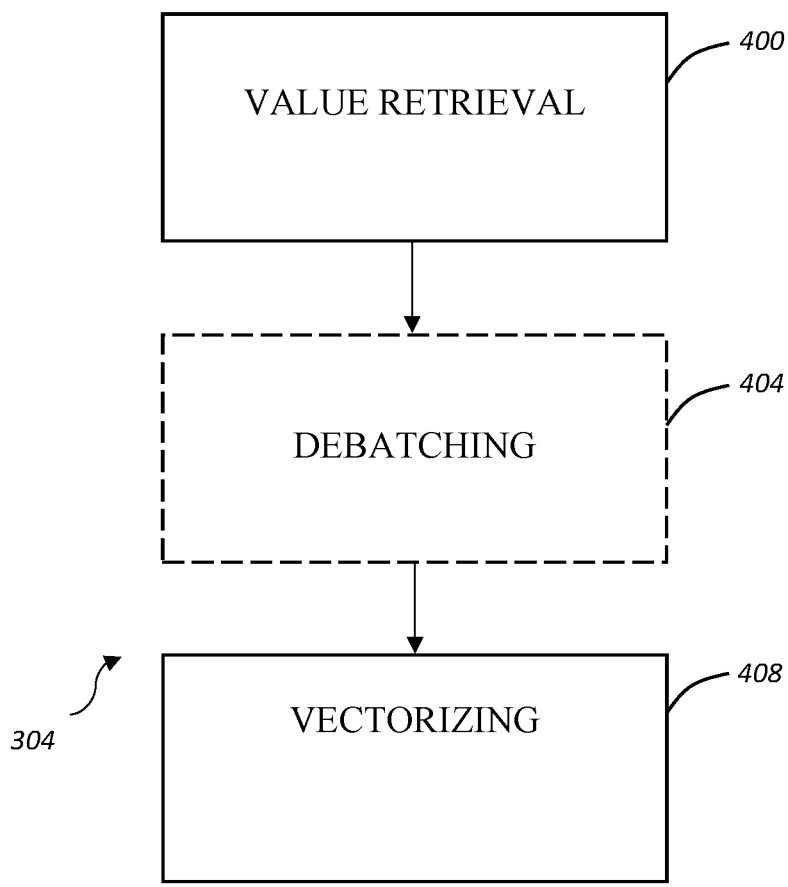
FIG. 4 is a flowchart detailing the ingestion step 304 of FIG. 3.

FIG. 4 is a flowchart detailing the ingestion process (Step 304) of FIG. 3. In one embodiment, data ingestion is managed by a worker process configured to operate as an ingestion manager (e.g., ingestion manager 200). The process illustrated in FIG. 4 may be performed by an ingestion manager, or by one or more worker processes operating at the direction of the ingestion manager.

Any data sets specified using, e.g., user input 100, are imported in the process of value retrieval (Step 400). Once imported, additional preprocessing (such as debatching, recasting as tuples) may be performed prior to storing the data. When the values have been loaded into memory and preprocessed, they are vectorized and loaded into long term storage (Step 408; e.g., using storage 112). In some instances, the values must be converted to a form that is suited to numerical analysis prior to vectorizing using one or more worker processes operating as vectorizers (e.g., numeric vectorizers, image vectorizers, text vectorizers, audio vectorizers, etc.).

Figure 5:
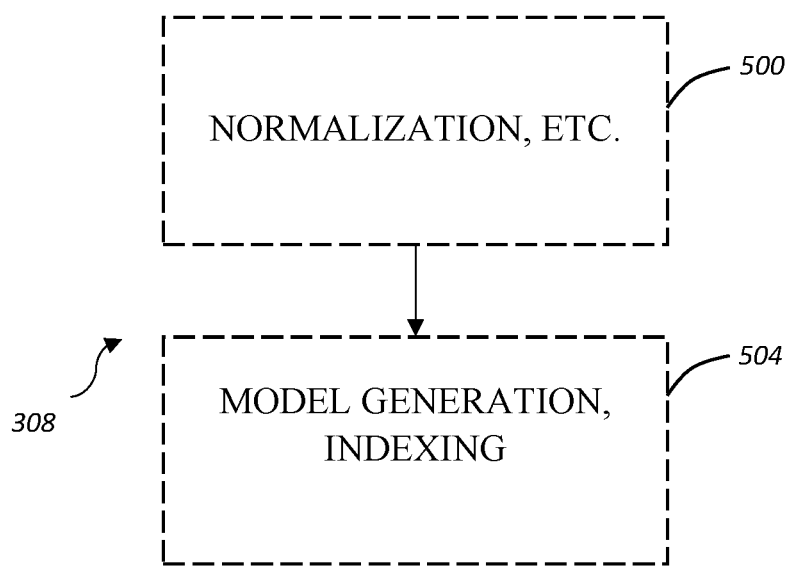
FIG. 5 is a flowchart detailing the pre-computation step 308 of FIG. 3.

FIG. 5 is a flowchart detailing the optional pre-computation process (Step 308) of FIG. 3. In one embodiment, pre-computation is managed by a worker process configured to operate as a compute manager (e.g., compute manager 208). The process illustrated in FIG. 5 may be performed by a compute manager, or by one or more worker processes operating at the direction of the compute manager.

Imported data sets in storage may be reviewed and have various adjustments made to make them suitable for transaction prediction (Step 500). Such adjustments may include, but are not limited to, normalization, filtering, computing statistical derivatives, debatching, recasting as tuples, etc.

Additional worker processes can create models to be used in connection with transaction predictions or otherwise index the ingested data sets in storage (Step 504). Model creation can happen before, after, or contemporaneously with the data adjustment (Step 500). In one embodiment, a worker process configured to operate as a regression operator 212 can perform one or more of MC, TC, FI, AFI, etc., in connection with indexing and/or model generation (Step 504). In another embodiment, a worker process configured to operate as an ANN operator 216 can perform one or more of MC, TC, FI, AFI, etc., in connection with indexing and/or model generation (Step 504).

Figure 6:
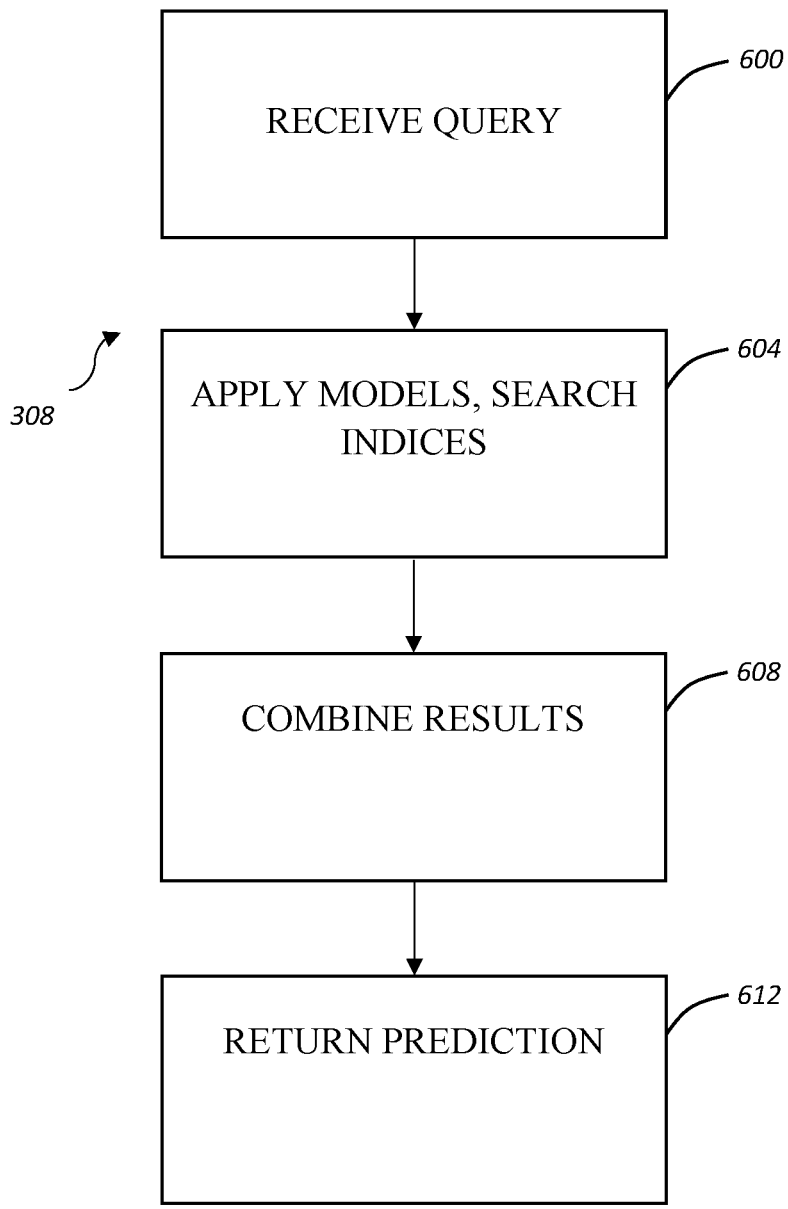
FIG. 6 is a flowchart detailing the transaction prediction step 316 of FIG. 3.

FIG. 6 is a flowchart detailing the process of transaction prediction (Step 316) of FIG. 3. In one embodiment, transaction prediction is managed by a worker process configured to operate as a query manager (e.g., query manager 220). The process illustrated in FIG. 6 may be performed by a query manager, or by one or more worker processes operating at the direction of the query manager.

Once a query tuple is received (Step 600), the query manager directs the prediction of the transaction associated with the tuple. In some embodiments, models and indices applicable to the query have already been generated in connection in one or more pre-computation processes (Step 308). In other embodiments, the models and indices are generated upon receipt of the query by, e.g., a query manager or a compute manager directing various other worker processes to create models and indices as described above.

The query manager directs various worker processes to apply the generated models or search the generated indices in connection with predicting the transaction specified in the query (Step 604). For example, a worker process configured as a ANN operator may utilize MC, TC, FI, AFI, etc. or a regression operator may apply MC, TC, FI, AFI, etc., in connection with the application of models.

Worker processes applying one or more models or searching one or more indices for relevant transactions may find one or more similar or relevant transactions. A worker process, such as the query manager or an aggregation manager (not shown), may combine these various results into a single answer along with a confidence level by, e.g., giving weight to results with higher signal-to-noise ratios (Step 608). The prediction and the confidence level may be returned to the user (Step 612) and, when desired, the system can be asked for the support behind the prediction.

In some embodiments, the data sets processed by the system may themselves specify the confidence level associated with one or more transactions contained in the data set. These specified errors can propagate through the application of the various algorithms discussed above, accounting for error introduced by model error, missing data from regression analysis, errors from neighbor distances in ANN, etc.

Figure 7:
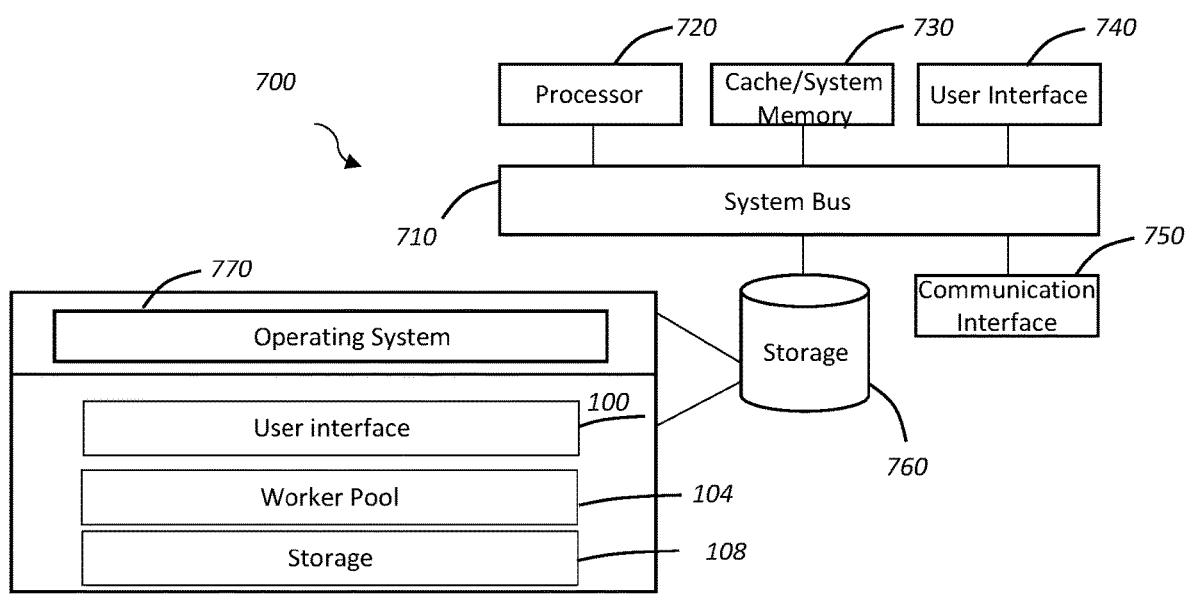
FIG. 7 is a block diagram of an exemplary hardware system for implementing the various components of the system that may implement the various methods described herein.

FIG. 7 illustrates an example of a hardware system 700 for implementing various devices that may participate in the various methods described herein. As shown in FIG. 7, the hardware 700 includes one or more system buses 710 that connect a processor 720, cache/system memory 730, a user interface 740, a communication interface 750, and storage 760. It will be understood that FIG. 7 is merely exemplary and constitutes, in some respects, an abstraction and that the actual organization of the components of the hardware 700 may vary and be more complex than illustrated.

The processor 720 may be any hardware device capable of executing instructions stored in memory 730 or storage 760 or otherwise processing data. As such, the processor 720 may include a microprocessor, a field programmable gate array (FPGA), application-specific integrated circuit (ASIC), or other similar devices. In some embodiments, such as those relying on one or more ASICs, the functionality described as being provided in part via software may instead be configured into the design of the ASICs and, as such, the associated software may be omitted.

The cache/system memory 730 may include various memories such as, for example, L1, L2, or L3 cache or system memory. As such, the memory 730 may include static random access memory (SRAM), dynamic RAM (DRAM), flash memory, read only memory (ROM), or other similar memory devices.

The user interface 740 may include one or more devices for enabling communication with a user such as a retailer, inventory planner, etc. For example, the user interface 740 may include a display, a mouse, a keyboard, a touchscreen, buttons, camera, microphone, haptic engine, etc. In some embodiments, the user interface 740 may include a command line interface or graphical user interface that may be presented to a remote terminal via the communication interface 750.

The communication interface 750 may include one or more devices for enabling communication with other hardware devices. For example, the communication interface 750 may include a network interface card (NIC) configured to communicate according to WiFi or Ethernet protocols. Additionally the communication interface 750 may implement a TCP/IP stack for communicating according to the TCP/IP protocols. In some embodiments, the communication interface 750 may include an NFC, Bluetooth, or other short range wireless interface. Various alternative or additional hardware or configurations for the communication interface 750 will be apparent.

The storage 760 may include one or more machine-readable storage media such as read-only memory (ROM), random-access memory (RAM), magnetic disk storage media, optical storage media, flash-memory devise, or similar storage media. In various embodiments, the storage 760 may store instructions for execution by the processor 720 or data upon which the processor 720 may operate. For example, the storage 760 may store an operating system 770 for controlling various basic operations of the hardware system 700.

As illustrated, the storage 760 may also store computer-executable instructions that implement the functionality of one or more of the user interface 100, worker pool 104, storage 108 and the other components described above.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for transaction prediction using a computer comprising a. processor and a non-transitory memory storing instructions configured to be executed by the processor, the method comprising:
   receiving a query;
   assigning the query to a servicing worker process selected from a worker pool;
   searching a data store for witness values to the query, wherein the witness values include data regarding a transaction including entities and metadata regarding the entities;
   aggregating, using a plurality of additional worker processes selected from the worker pool and instantiated by the servicing worker process, the witness values to generate an answer and a confidence level, wherein each of the additional worker processes is configured to apply one or more specific operations to the witness values, wherein a first additional worker process is configured to apply a different specific operation from a second additional worker process, wherein the first additional worker process comprises an approximate nearest neighbor (ANN) worker process that identifies similar transactions to an input transaction, wherein the ANN worker process fills gaps in ingested data related to the query and precomputes values in connection with transaction prediction related to the query, wherein the ANN worker process operates independently of the servicing worker process. wherein the confidence level is based, at least in part, on an error from a neighbor distance in the ANN worker process;
   transmitting the answer and the confidence level;
   receiving a request for support for the answer; and
   providing at least one of the witness values, wherein the witness values indicate why the answer and the confidence level were generated.

2. The method of claim 1 wherein the query is a plurality of attributes.

3. The method of claim 1 further comprising spawning the servicing worker process and the plurality of additional worker processes to analyze the stored witness values.

4. The method of claim 1 wherein aggregating the witness values gives higher weights to witness values having higher confidence.

5. The method of claim 1 wherein aggregating the witness values gives higher weights to witness values similar to the query.

6. The method of claim 1 wherein searching the data store uses at least one of matrix completion, tensor completion, feature inference and action feature inference on entries in the data store to generate witness values for the query.

7. The method of claim 1 further comprising:
receiving at least one transaction, each transaction comprising a tuple and an associated value;
converting the associated value into a vector; and
storing the tuple and vector in the data store.

8. The method of claim 7 wherein the answer and the confidence level are computed using a regression on stored vectors.

9. The method of claim 7 wherein the answer and the confidence level are computed by computing similarity measures between at least two stored vectors.

10. The method of claim 7 wherein the associated value is selected from the group consisting of an image, and location data.

11. The method of claim 7 further comprising:
receiving a request for support concerning the answer; and
providing at least one of the witness values and the received value associated with the at least one witness value in response to the request for support.

12. The method of claim 1 wherein the query takes the form: (actor, action, object).

13. The method of claim 12 wherein the query is selected from the group consisting of: (country interaction country), (source IP address, communicate, destination IP address), (customer browse article), and (customer buy article).

14. The method of claim 1, wherein the worker pool comprises a vectorizer worker process that converts input data into data for storage and processing.

15. The method of claim 1, wherein the worker pool comprises a regression worker process that performs matrix completion (MC), tensor completion (TC), feature inference (FI), and action feature inference (AFI).

16. The method of claim I. wherein the query is received from a user interface device, and wherein the answer and the confidence level are transmitted to the user interface device.

17. A system for transaction prediction, the system comprising:
at least one data store, the data store comprising a computer-readable memory storing a plurality of vectors and tuples of attributes;
a computing pool in communication with the at least one data store and comprising a plurality of worker tasks; and
an interface in communication with the computing pool and configured to:
receive a query and communicate the query to the computing pool for execution, wherein executing the query comprises:
assigning the query to a servicing worker task selected from the plurality of worker tasks;
searching for witness values that include data regarding a transaction including entities and metadata regarding the entities, and
aggregating, using a plurality of additional worker tasks selected from the plurality of worker tasks and instantiated by the servicing worker task, the witness values to generate an answer and a confidence level, wherein each of the additional worker processes is configured to apply one or more specific operations to the witness values, wherein a first additional worker process is configured to apply a different specific operation from a second additional worker process, wherein the first additional worker process comprises an approximate nearest neighbor (ANN) worker process that identifies similar transactions to an input transaction, wherein the ANN worker process fills gaps in ingested data related to the query and precomputes values in connection with transaction prediction related to the query, wherein the ANN worker process operates independently of the servicing worker process. wherein the confidence level is based, at least in part, on an error from a neighbor distance in the ANN worker process:
transmit the answer to the query and the confidence level;
receive a request for support for the answer; and
provide at least one of the witness values, wherein the witness values indicate why the answer and the confidence level were generated.

18. The system of claim 17 wherein each worker task in the plurality of worker tasks is dynamically configurable to perform a different operation.

19. The system of claim 17 wherein the query is a plurality of attributes.

20. The system of claim 17 wherein the computing pool executes the query by assigning it to the servicing worker task that searches the at least one data store for witness values to the query, aggregates the witness values into an answer and a confidence level, and returns the answer and the confidence level.

21. The system of claim 20 wherein the servicing worker task gives higher aggregation weights to witness values having higher confidence.

22. The system of claim 20 wherein the servicing worker task gives higher aggregation weights to witness values similar to the query.

23. A non-transitory computer-readable medium storing computer-executable instructions which, when executed by one or more computers, cause the one or more computers to perform operations comprising:
receiving a query;
assigning the query to a servicing worker process selected from a worker pool;
searching a data store for witness values to the query, wherein the witness values include data regarding a transaction including entities and metadata regarding the entities;
aggregating, using a plurality of additional worker processes selected from the worker pool and instantiated by the servicing worker process, the witness values to generate an answer and a confidence level, wherein each of the additional worker processes is configured to apply one or more specific operations to the witness values, wherein a first additional worker process is configured to apply a different specific operation from a second additional worker process, wherein the first additional worker process comprises an approximate nearest neighbor (ANN) worker process that identifies similar transactions to an input transaction, wherein the ANN worker process fills gaps in ingested data related to the query and precomputes values in connection with transaction prediction related to the query, wherein the ANN worker process operates independently of the servicing worker process, wherein the confidence level is based, at least in part, on an error from a neighbor distance in the ANN worker process;
transmitting the answer and the confidence level;
receiving a request for support for the answer; and
providing at least one of the witness values, wherein the witness values indicate why the answer and the confidence level were generated.

\* \* \* \* \*

UNITED STATES PATENT AND TRADEMARK OFFICE
CERTIFICATE OF CORRECTION

PATENT NO. : 11,062,224 B2
APPLICATION NO. : 15/294659
DATED : July 13, 2021
INVENTOR(S) : Chen et al.

It is certified that error appears in the above-identified patent and that said Letters Patent is hereby corrected as shown below:

In the Claims

In Column 12, Line 29, in Claim 1, delete "a." and insert --a-- therefor

In Column 12, Line 55, in Claim 1, delete "process." and insert --process,-- therefor In Column 13, Line 44, in Claim 16, delete "claim I." and insert --claim 1,-- therefor In Column 14, Line 17, in Claim 17, delete "process:" and insert --process;-- therefor Signed and Sealed this
Eighth Day of November, 2022

Katherine Kelly Vidal
*Director of the United States Patent and Trademark Office*